United States Patent [19]

Furuyama

[11] Patent Number: 5,027,235

[45] Date of Patent: Jun. 25, 1991

[54] METHOD FOR CONTROLLING A DYNAMIC TRACKING HEAD OF A DIGITAL VIDEO TAPE RECORDER

[75] Inventor: Takenori Furuyama, Kanagawa, Japan

[73] Assignee: Sony Corporation, Tokyo, Japan

[21] Appl. No.: 381,287

[22] Filed: Jul. 18, 1989

[30] Foreign Application Priority Data

Jul. 28, 1988 [JP] Japan .................................. 63-189478

[51] Int. Cl.⁵ ............................................. G11B 5/592
[52] U.S. Cl. .............................. 360/77.16; 360/77.13; 360/10.3
[58] Field of Search ..................... 360/10.1, 10.2, 10.3, 360/77.13, 77.16

[56] References Cited

U.S. PATENT DOCUMENTS 4,933,784  6/1990  Oldershaw et al. .............. 360/77.16

OTHER PUBLICATIONS

R. Brush, "Design Considerations for the D-2 NTSC Composite DVTR", SMPTE J., 97:182–193, Mar. 1988.
T. Eguchi, "The SMPTE D-1 Format and Possible Scanner Configurations", SMPTE J., 96:166–170, Feb. 1987.

*Primary Examiner*—Vincent P. Canney
*Assistant Examiner*—David L. Robertson
*Attorney, Agent, or Firm*—Alvin Sinderbrand; William S. Frommer

[57] ABSTRACT

In a method for controlling a dynamic tracking head so as to reproduce a digital video signal from a field video signal recorded on a plurality of segmented video tracks formed on a video tape, the rotation speed of a drum carrying the heads is increased to cause such heads to precisely trace the plurality of video tracks forming one field video signal in a reduced time so as to provide enough time for the video heads to jump from the end portion of the current video tracks to the beginning portion of the next video tracks.

6 Claims, 5 Drawing Sheets

METHOD FOR CONTROLLING A DYNAMIC TRACKING HEAD OF A DIGITAL VIDEO TAPE RECORDER

BACKGROUND OF THE INVENTION

1. Field of the Invention

The present invention relates generally to a method for controlling a dynamic tracking head and more particularly to a method for controlling a dynamic tracking head of a digital video tape recorder for recording and reproducing a segmented track type format.

2. Description of the Prior Art

Figure 1:
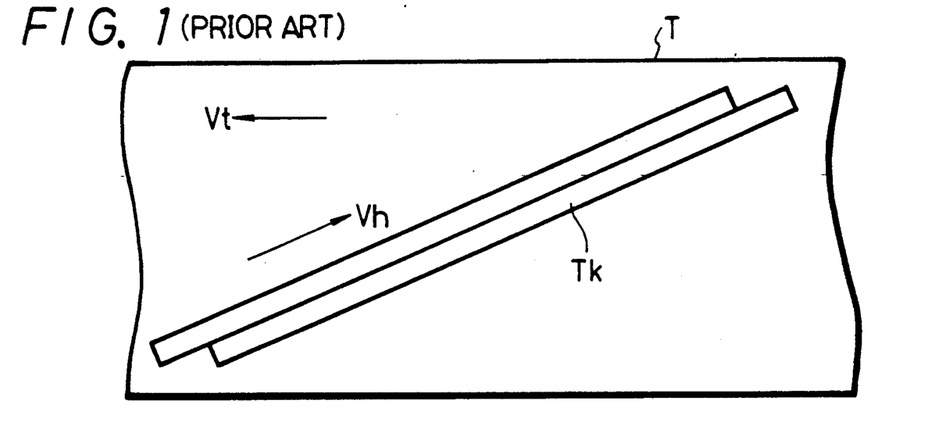
FIG. 1 is a diagrammatic view of a section of a magnetic tape for and illustrating recorded tracks according to a conventional analog video tape recorder.

According to a prior-art helical scan type analog video tape recorder for recording an analog video signal by a rotary magnetic head, a slanted recording track Tk is formed on a magnetic tape. One field of the analog video signal is recorded on one track starting at the beginning portion as shown in FIG. 1. In FIG. 1, Vh represents the moving direction of the magnetic head and Vt represents the transportation direction of the magnetic tape T.

When a video signal is reproduced from the above-mentioned magnetic tape T, in (1) a variable tape speed playback mode such as a still picture playback mode, (2) slow motion playback mode or (3) a high speed playback mode, the tracing locus of the magnetic head intersects the recorded track, lowering the level of a reproduced RF signal, the generation of a cross-talk component and so on.

To solve the above-mentioned problems, a so-called dynamic tracking technique is employed. According to this dynamic tracking technique, the magnetic head is mounted on a rotary head drum through, for example, a piezo-electric bimorph plate. A control signal is applied to the piezo-electric bimorph plate to displace the magnetic head in the widthwise direction of the magnetic tape so that even in the variable tape speed playback mode, the magnetic head precisely traces a predetermined track.

In the above-mentioned dynamic tracking technique, the displacing direction of the magnetic head is opposite at the starting portion and the ending portion of the track. When the magnetic head moves (or jumps) from the end portion of the current predetermined video track (field) to the starting portion of the next predetermined video track (field), the polarity of the control signal is inverted thereby moving the magnetic head from one end portion of its range of displacement to its other end portion. This movement of the magnetic head is performed outside of the tape wrapping range and during a period (blank period) in which the magnetic head rotates without contacting the magnetic tape. U.S. Pat. No. 4,287,538 discloses an apparatus for controlling the above-mentiond movement of the magnetic head, or the track jump of the magnetic head.

Recently, International Standard (D-1 Standard) for a digital video tape recorder for digitally recording a component type video signal (luminance signal Y and difference chrominance signals R-Y and B-Y) has been determined.

Figure 2:
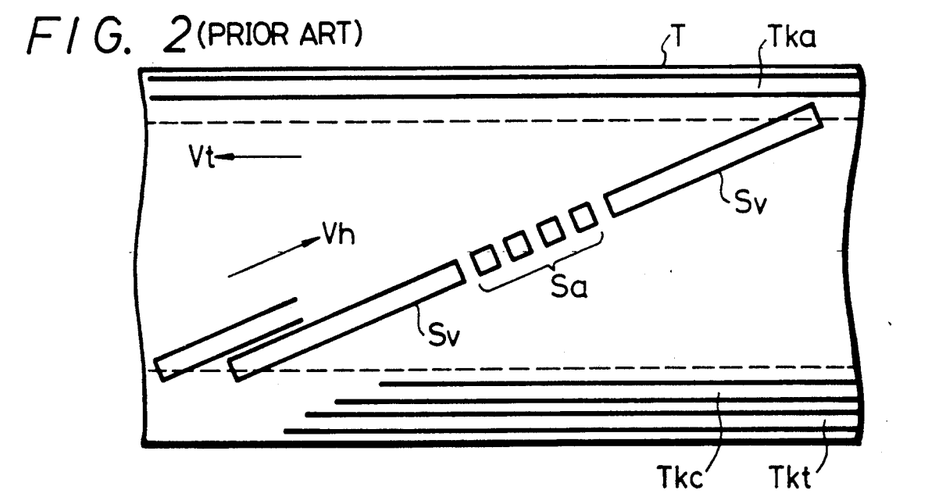
FIG. 2 is a diagrammatic view of a section of a magnetic tape for illustrating recorded tracks thereon according to a conventional digital video tape recorder.

FIG. 2 is a diagrammatic view of a section of a magnetic tape T, illustrating a slanted recording track according to this D-1 standard. The slanted recording track is called a "program track" and is comprised of (1) two segmented video tracks or sectors (half tracks) Sv in which digital video data are recorded, and (2) four segmented audio tracks or sectors Sa in which digital audio data are recorded. Further, a cue/audio track Tka, a servo control track Tkc and a time code track Tkt are formed on the magnetic tape T in the longitudinal direction thereof.

The above-mentioned track pattern is substantially common to a 525/60 system having 525 horizontal lines and a field frequency of 60 Hz (nominal frequency) and a 625/50 system having 625 horizontal lines and a field frequency of 50 Hz.

The D-1 system format handles much data. As a result, a 4-channel processing system is used in order to reduce a transmission rate for the data. As, for example, shown in FIG. 3, four magnetic heads H1, H2, H3 and H4 are paired two by two to provide head pairs HA (including H1 and H2) and HB (including H3 and H4). The head pairs HA and HB are mounted on a rotary head drum RD with an angular destance of 180 degrees. The magnetic tape T is wound around the rotary head drum RD over a tape wrapping angle of 260 degrees. Video signal data are recorded on recorded tracks of tape wrapping angles of 120 degrees between points A and B and between points C and D. Audio data is recorded on the recorded track at a tape wrapping angle of 20 degrees between points B and C.

The two slanted recording tracks Sv shown in FIG. 2 are sequentially formed on the magnetic tape T by the above-mentioned head pairs HA and HB.

Figure 4:
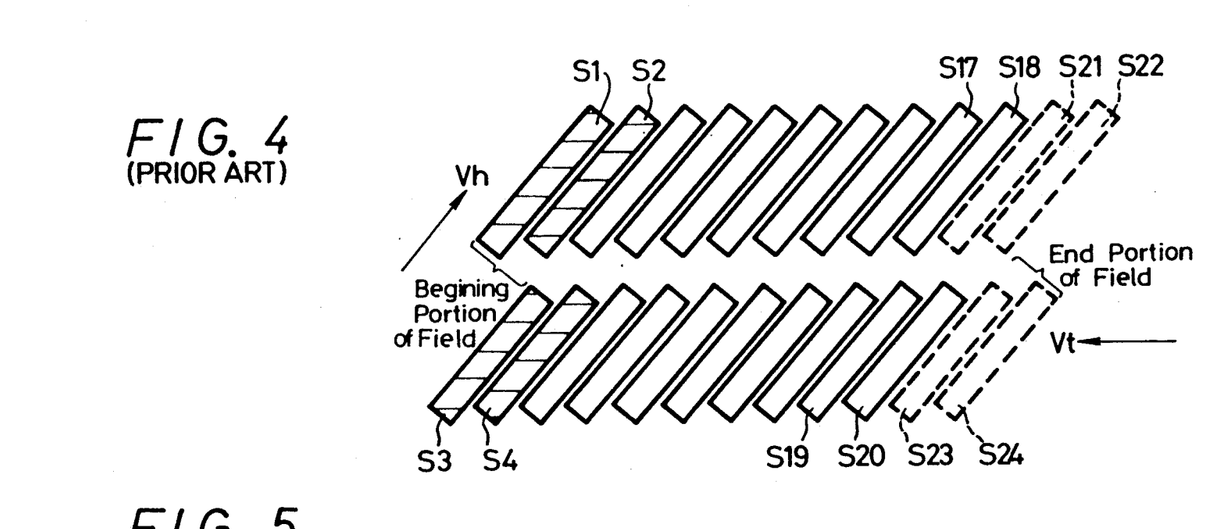
FIG. 4 is a schematic diagram showing a recording format of the prior-art digital video tape recorder of FIG. 3.

In the case of the 525/60 system format, one field of video data is recorded on 20 segmented video tracks S1 to S20 corresponding to 10 slant tracks as shown by the solid lines in FIG. 4.

In the case of the 625/50 system format, while the data transmission rate is the same as that of the 525/60 system format, the duration of the field cycle thereof is long so that one field of video data is recorded on 24 segmented video tracks S1 to S24 (four segmented video tracks S21 to S24 are additionally provided)/corresponding to 12 slant tracks.

Figure 3:
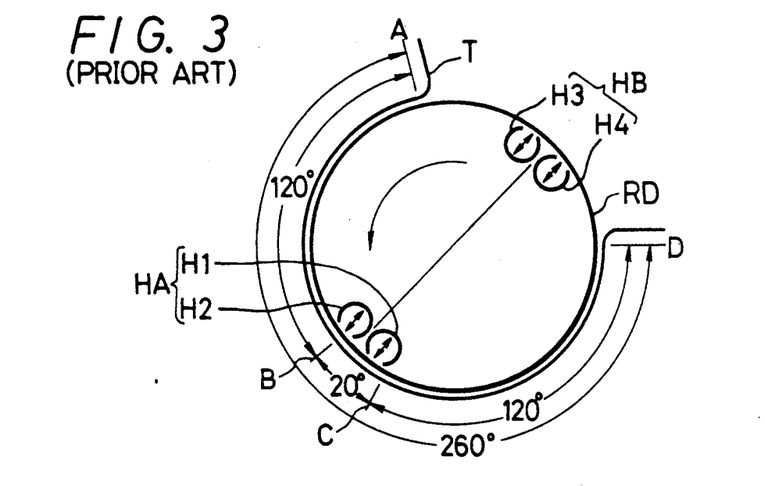
FIG. 3 is a schematic diagram showing a main portion of a prior-art digital video tape recorder.

In both cases, the four segmented video tracks S1 to S4 cross-hatched in FIG. 4 respectively correspond to the four magnetic heads H1 to H4 shown in FIG. 3, and form one segment set.

The recording of one field of video data is started at the segmented video tracks S1 and S2 (the upper side of FIG. 4) which start from substantially the central portion of the magnetic tape along its width and which ends at the end portions of the segmented video tracks S19, S20 or S23, S24 at the nearby-portion of the servo control track Tkc (see FIG. 2).

When the digital video tape recorder having the D-1 type format reproduces the recorded video signal in the variable tape speed playback mode, there then is presented the following problem of data dropout.

As earlier noted, according to the D-1 type format, the starting portion and the ending portion of one field are both located at the central portion of the magnetic tape and the length of one field in the longitudinal direction of the track is short. For this reason, it is mechanically difficult for the magnetic head to jump from the end portion of the current predetermined field to the starting portion of the next predetermined field during a period in which the magnetic head also passes this short distance (the segmented audio tracks) by the above-mentioned dynamic tracking technique. As a result, reproduced data at the starting portion of the field, for example, reproduced data of 3 segmented video tracks (half tracks) can not be obtained sufficiently causing the image quality of the reproduced picture to be deteriorated.

OBJECTS AND SUMMARY OF THE INVENTION

It is a general object of the present invention to provide an improved method for controlling a dynamic tracking head so as to overcome the above-mentioned defects inherent in the prior art.

It also is an object of the present invention to provide a method for controlling a dynamic tracking head to precisely trace a segmented video track starting from a beginning portion of each field during a variable speed playback mode.

It is another object of the present invention to provide a method for controlling a dynamic tracking head during a playback mode which has a desired tape speed.

According to an aspect of the present invention, there is provided a method for controlling a dynamic tracking head of a digital video tape recorder so as to record a digital video, signal, wherein one field of said digital video signal is recorded on a plurality of segmented video tracks formed on a video tape wrapped around head drum having a rotating speed, wherein during a reproducing mode said videotape is transported at a different speed than the transport speed during the record mode, and comprising the steps of:

(a) detecting a transportation speed of the video tape;
(b) forming a predetermined signal waveform in response to a pulse signal generated in accordance with the rotation of said head drum;
(c) reforming said predetermined signal waveform in response to said detected transportation speed of the video tape;
(d) determining an initial head position for said dynamic tracking head by detecting a position of the video tape which can be used to precisely locate said dynamic tracking head at a beginning position of said segmented video tracks;
(e) combining said reformed predetermined signal waveform and said determined initial head position for generating a drive signal of said dynamic tracking head; and
(f) changing said rotation speed of said head drum for tracing said plurality of segmented video tracks in a shorter time so that enough time is provided for said dynamic tracking heads to jump from an end portion of said plurality of segmented video tracks to a beginning portion of another plurality of segmented video tracks.

These and other objects, features and advantages of the present invention will be apparent in the following detailed description of preferred embodiments when read in conjunction with the accompanying drawings, in which like reference numerals are used to identify the same or similar parts in the several views.

DETAILED DESCRIPTION OF PREFERRED EMBODIMENTS

The present invention will now be described with reference to the drawings.

Figure 5:
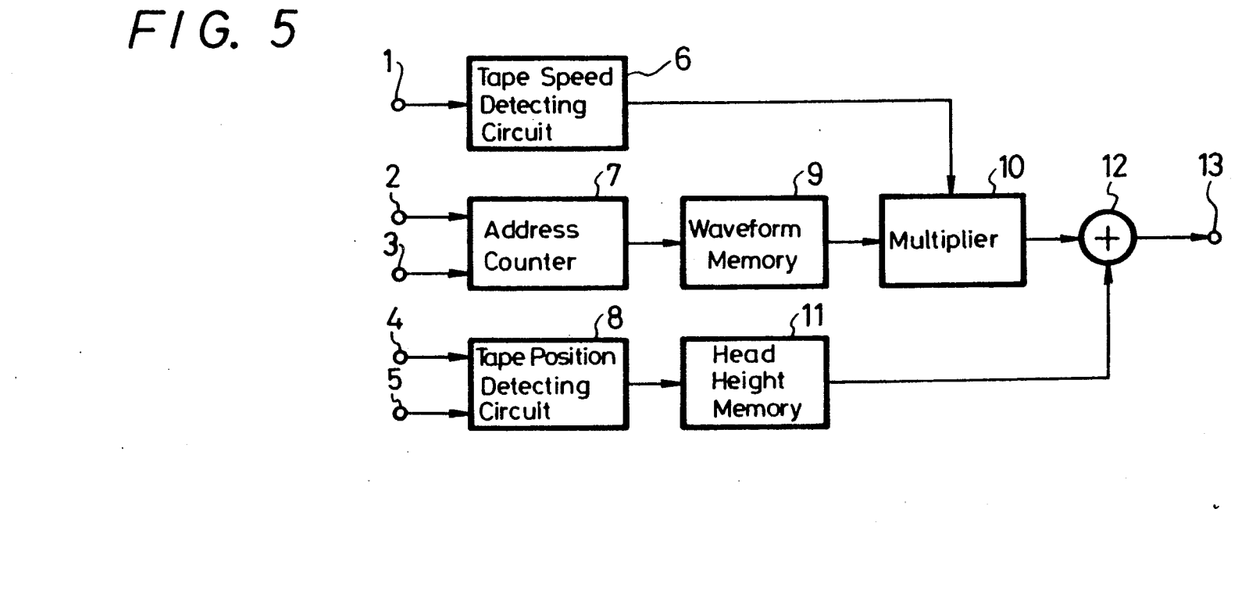
FIG. 5 is a block diagram of a circuit according to an embodiment of the present invention.

Referring to FIG. 5, a circuit diagram is shown according to an embodiment of the present invention in which a pulse signal is obtained in response to a rotation of a capstan. For example, a capstan FG pulse, Cap FG, is supplied through an input terminal 1 to a tape speed detecting circuit 6. The input terminals 2 and 3 receive two kinds of pulse signals obtained in response to the rotation of the rotary head drum, i.e., a drum FG pulse and a drum PG pulse, respectively. The frequency of the drum FG pulse is generally selected to be much higher than the frequency of the drum PG pulse. The drum FG pulse and the drum PG pulse are supplied to an address counter 7. In this example, the drum FG pulse functions as a count clock and the drum PG pulse functions as a reset pulse for resetting the address counter 7.

The output signal of the address counter 7 is supplied to a waveform memory. The waveform memory 9 utilizes the output signal of the address counter 7 as an address signal to generate a signal whose level corresponds to the address signal. The waveform of the output signal from the waveform memory 9 between two contiguous drum PG pulses is represented as inclined waveform similar to the waveform shown in FIG. 6A ranging from a time point t0 to a time point t4.

Referring back to FIG. 5, the output signal of the waveform memory 9 is supplied to a multiplier 10. The multiplier 10 also receives the tape speed signal output from the tape speed detecting circuit 6 for use as a multiplication coefficient. Accordingly, the multiplier 10 changes the inclination of the inclined waveform of the output, signal from the waveform memory 9 by a factor defined by the tape speed.

The initial head height, or the initial track height of each field also has to be determined. The capstan FG pulse, Cap FG and a reproduced CTL signal, PB CTL are supplied through input terminals 4 and 5 to a tape position detecting circuit 8 for detecting the tape position. The detected position signal is output to a head height memory 11 which then generates a head height signal. The head height signal output from the head height memory 11 is supplied to an adder 12, where it is added to the inclined waveform signal output from the multiplier 10. The resulting signal is fed to an output terminal 13. The signal developed at the output terminal 13 is used to drive the piezo-electric bimorph plate or a mechanical actuator (not shown) and to cause the video head to precisely trace the track.

Figure 6A:
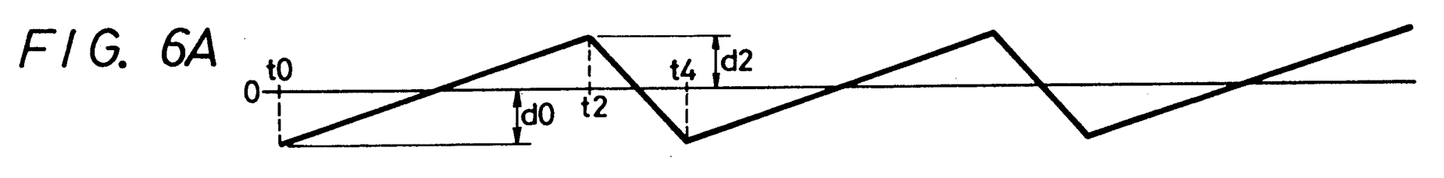
FIGS. 6A and 6B are timing charts used to explain the operation of a circuit according to an the embodiment of the present invention.
Figure 6B:
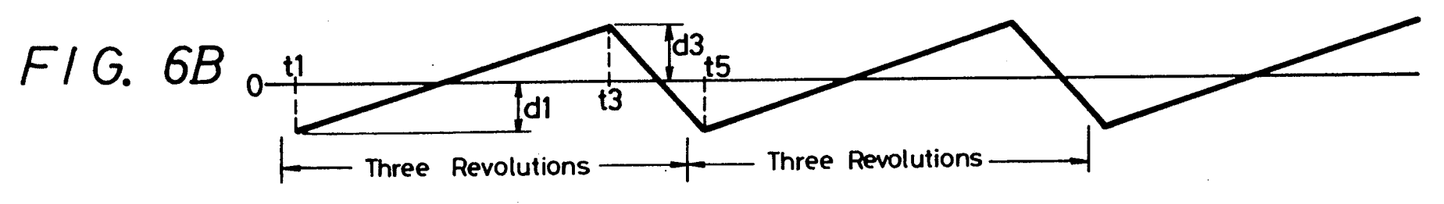
Figure 7:
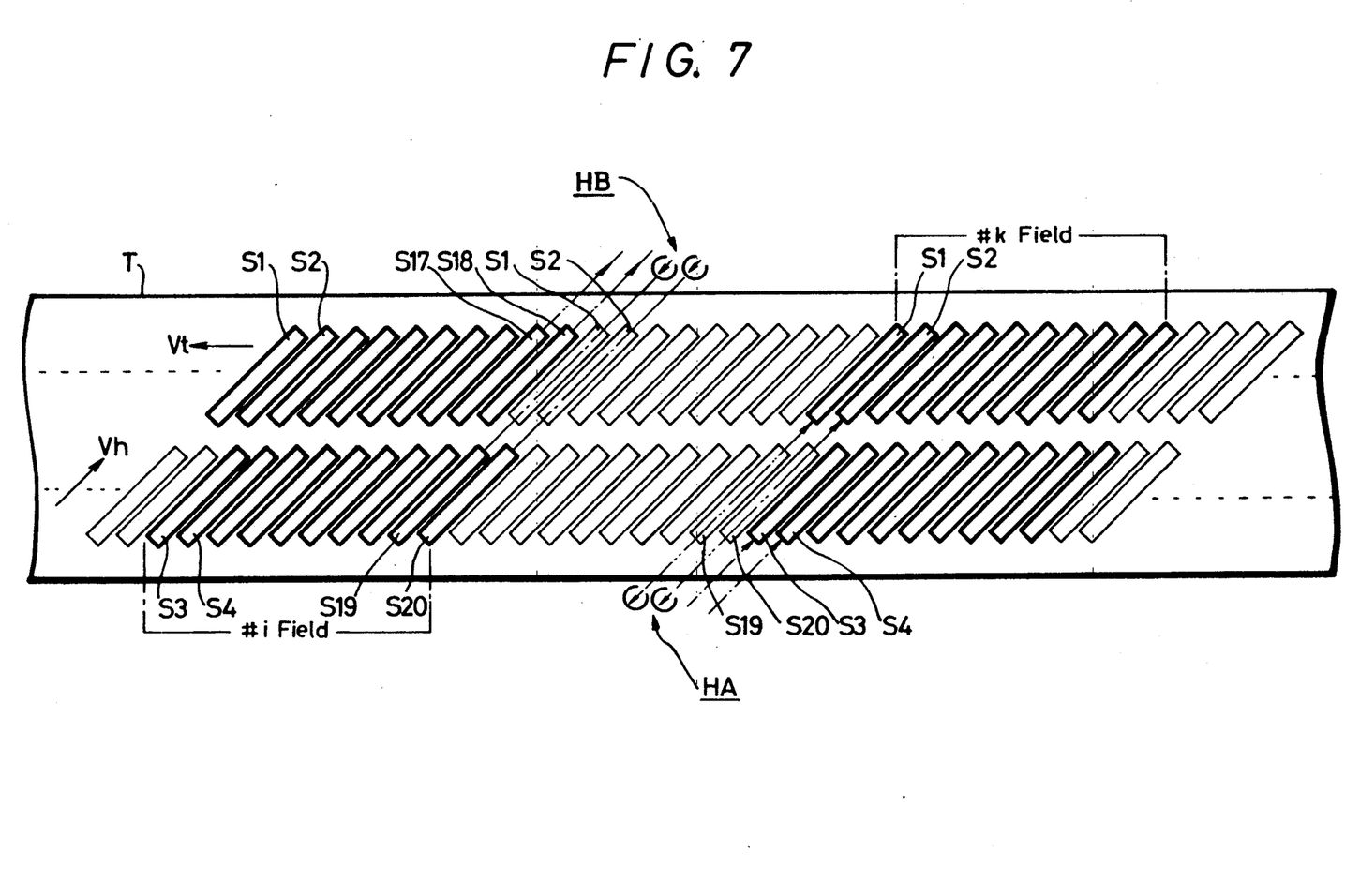
FIG. 7 is a schematic diagram showing a recording format according to an embodiment of the present invention.

The dynamic tracking operation of the digital video tape recorder according to the present invention is explained below with reference to FIGS. 6A, 6B and FIG. 7, for a D-1 format of a 525/60 system (FIGS. 6A and 6B) and a D-1 format of a 525/60 system (FIG. 7).

In this embodiment, let us assume the following operation. In the twice normal tape speed reproduction mode, when the video head finishes, tracing the #i field, the video head jumps to the next field, the #j field which includes a group of segmented video tracks as shown by the fine lines at the central portion of FIG. 7, then to the next field, the #k field, to start to trace the same.

More specifically, one head pair, for example, HA tracing the segmented video tracks S17 and S18 of the #i field reaches the other tape edge after the magnetic tape-non contact blank period and again comes in contact with the magnetic tape T as shown by two dot-chain lines in FIG. 7. After the head pair HA traces the final segmented video tracks S19, S20 of the #j field, the head pair HA starts tracing the initial segmented video tracks S1, S2 of the #k field.

The other head pair, for example, the head pair HB tracing the final segmented video tracks S19, S20 of the #i field finishes tracing the first segmented video tracks S1, S2 of the #j field and then reachs the other tape edge after the magnetic tape T non-contact blank period. Thereafter, the head pair HB starts tracing the segmented video tracks S3, S4 of the #k field.

In this embodiment, in order to enable both the head pairs HA and HB to trace the segmented video tracks as described above, the displacement of the head pairs is controlled as shown in FIGS. 6A and 6B.

Assuming a time point t0 to be a reference point at which the head pair HA starts tracing the initial segmented video tracks S1 and S2 of the #i field to as shown in FIG. 6A, then the head pair HA is displaced to the negative direction (the down stream side of the magnetic tape T) at a maximum displacement. At a time point t2 in which the rotating head drum is rotated a little more than twice and the head pair HA finishes tracing the segmented video tracks S17 and S18 of the #i field, the head pair HA is displaced to the positive direction (the upper stream side of the magnetic tape T) at a maximum displacement. Then, during a period consisting of the sum of the blank period and the tracing period of the segmented video tracks S19 and S20 of the #i field, the displacement direction of the head pair HA is inverted. At a time point t4 in which the head pair HA begins to trace the initial segmented video tracks S1 and S2 of the #k field, the head pair HA is again displaced to the negative direction a maximum displacement similar to the reference time point t0. In the normal playback mode, the revolution rate of the head drum is 150 r.p.s so that during a one field period, the rotating head drum is rotated at 150/60=2.5 times. This, however, cannot provide enough time for the head pair to jump the tracks. In order to solve this problem, the revolution rate of the head drum is increased so as to rotate three times within one field time. With the above-mentioned arrangement, the time for the head pair to trace from the segmented video tracks S1 and S2 to the segmented video tracks S17 and S18 of the #i field is reduced so that the time necessary for the head pair to jump the tracks is inevitably increased.

As shown in FIG. 6A, the rotating head drum is rotated three times during the period from the reference time point t0 to the next tracing start time point t4.

The other head pair HB begins to trace the segmented video tracks S3 and S4 of the #i field from a time point t1 slightly delayed from the reference time point t0, as shown in FIG. 6B. At this time point t1, the head pair HB is displaced to the negative side (down stream side of the magnetic tape T) at a maximum displacement. At a time point t3 after the time point t1 during which the head drum is rotated a little more than twice and the head pair HB finishes tracing the final segmented video tracks S19 and S20 of the #i field, the head pair HB is displaced to the positive direction (upper stream side of the magnetic tape T) at a maximum displacement. Then, as mentioned before, during a period consisting of a sum of the tracing period of the initial segmented video tracks S1 and S2 of the #j field and the blank period, the displacement direction of the head pair HB is inverted. At a time point t5 in which the head pair HB begins to trace the segmented video tracks S3 and S4 of the #k field, the head pair HB is again displaced to the negative direction similar at to the displacement at time point t1 at maximum displacement.

The trace and the jump of both the head pairs HA and HB will be repeatedly carried out at the cycle three times the rotation cycle of the head drum.

Since the magnetic tape T is transported by a predetermined amount during the period between the respective trace starting time points t0 and t1 of both the head pairs HA and HB, an absolute value of a displacement amount d0 of one head pair HA at the trace starting time point t0 is equal to an absolute value of a displacement amount d3 of the other head pair HB at the trace ending time point t3. In addition, an absolute value of a displacement amount d2 of one head pair HA at the trace ending time point t2 is equal to an absolute value of a displacement amount d1 of the other head pair HB at the trace starting time point t1. Relationships expressed as d0>d2 and d1<d3 are established between the displacement amounts of the same head pair.

In the digital video tape recorder, the displacement amount of the head pair is large so that the previously aforementioned piezo-electric bimorph plate may be replaced with a stepping motor and a steel belt for displacing the magnetic head (as disclosed in Japanese Patent Application No. 62-327782 proposed by the same assignee of the present application.)

As described above, according to the present embodiment, a sufficiently long time consisting of the sum of the blank period and the tracing period of the half track (segmented video track) can be used for the magnetic head to jump the tracks so that the magnetic head can positively start tracing the initial half track of the predetermined next field.

According to the present invention, as described above, the revolution rate of the head drum is increased from 2.5 r.p.s to 3.0 r.p.s, or is increased by 6/5 times the revolution rate of the head drum in the recording mode. The digital video signal is timebase-expanded by using a frame memory, whereby a picture can be reproduced successively at a field unit.

Further, in the normal playback mode, the revolution rate of the head drum is increased to be, for example, 6/5 times, thereby causing the magnetic head to jump the tracks.

Figure 8:
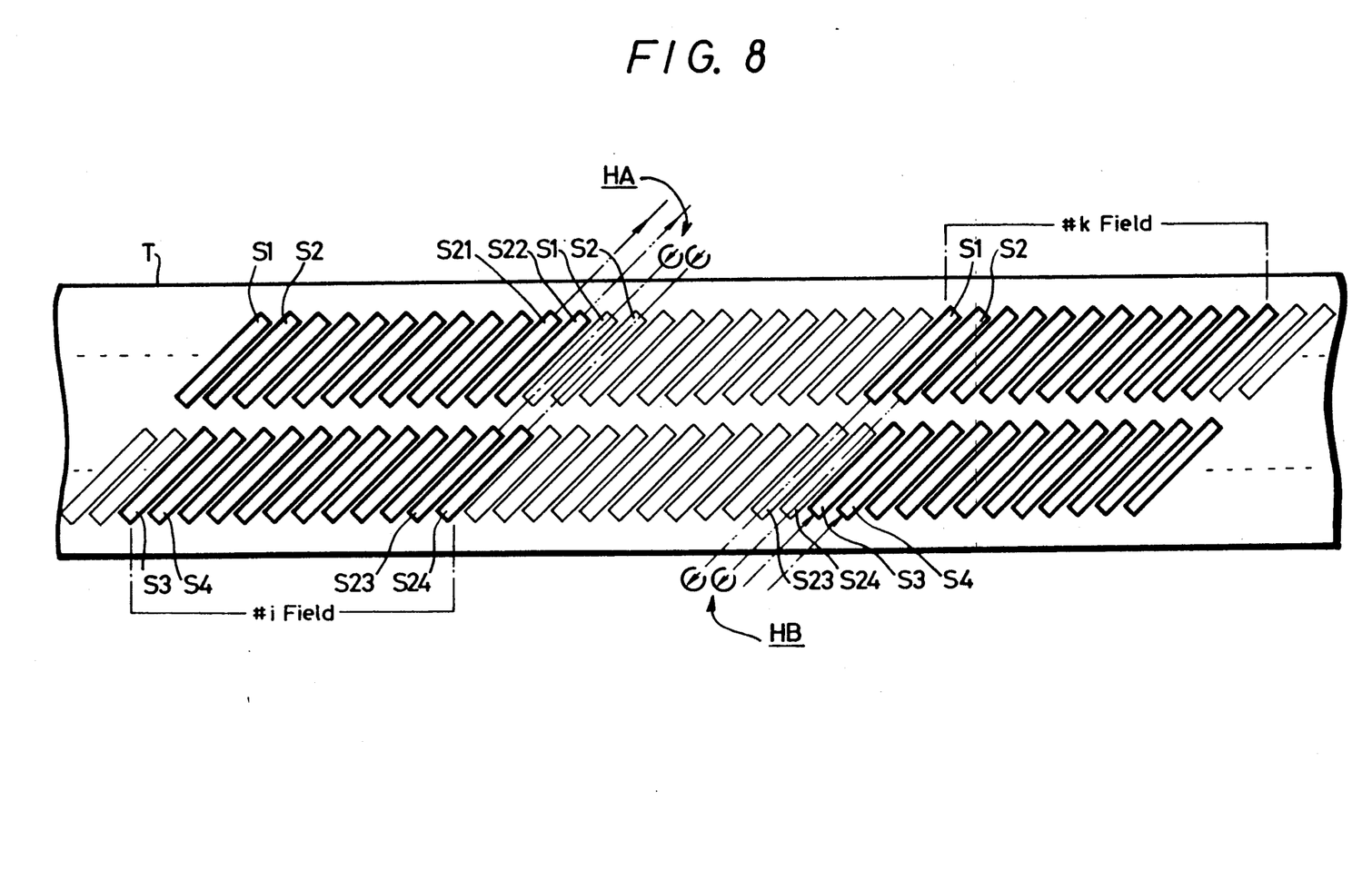
FIG. 8 is a schematic diagram showing a recording format according to another embodiment of the present invention.
Figure 9A:
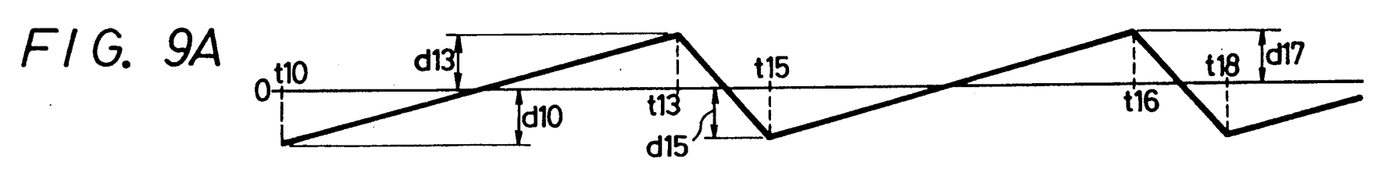
FIGS. 9A and 9B are timing charts used to explain the operation of a circuit according to another embodiment of the present invention.
Figure 9B:
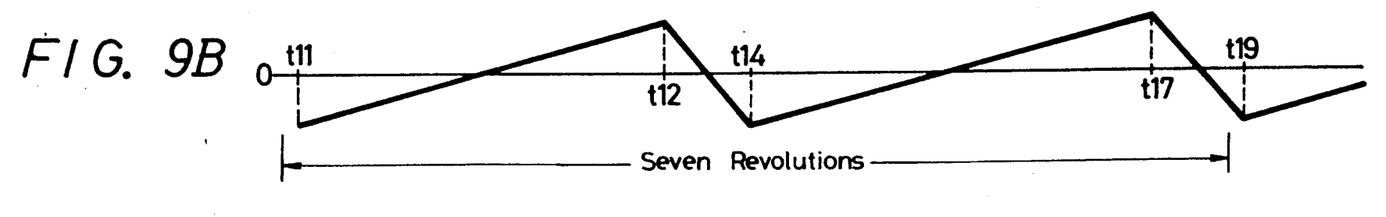

Another embodiment of the present invention will hereinafter be described with reference to FIG. 8 and FIGS. 9A and 9B, in which the dynamic tracking method of the digital video tape recoder according to the present invention is applied to the 625/50 system D-1 format. In FIG. 8 and FIGS. 9A and 9B, like parts corresponding to those of FIGS. 6A and 6B and FIG. 7 are marked with the same reference markings and therefore need not be described in detail.

FIG. 8 shows the 625/50 system D-1 format. As described hereinbefore, according to the 625/50 system D-1 format, one field of video data are recorded in 24 segmented video tracks.

Also in this embodiment, let it be assumed that in the variable tape speed playback mode, when the tracing of the #i field is ended, the magnetic head jumps to the next field, the #j field which includes a group of segmented video tracks shown by thin lines, at the central portion of FIG. 8. The magnetic head then starts tracing the next field, the #k field.

With respect to the tracing operations of both the head pairs HA and HB, segmented video, tracks, (S17 to S20]of the end portion of each field as explained for FIG. 7 may be replaced with the segmented video tracks [S21 to S24] of the embodiment for FIG. 8

In the embodiment for FIG. 8, during one field period, both the head pairs HA and HB trace 7×2 tracks so that the head pairs, which trace the initial video sectors, are exchanged at every field.

Assuming for example, as shown in FIG. 9A, one head pair HA starts tracing the initial segmented video tracks S1 and S2 of the #i field at a time point t10 and that, as shown in FIG. 9B, the other head pair HB starts tracing the segmented video tracks S3 and S4 of the #i field at a time point t11 slightly delayed from the time point t10. The head pair HB then finishes tracing the segmented video tracks S21 and S22 of the #i field at a time point t12 in which the head drum is rotated 2.5 times from the time point t11. On the other hand, the head pair HA finishes tracing the final segmented video tracks S23 and S24 of the #i field at a time point t13 in which the head drum is rotated 3 times from the time point t10.

Both head pairs HB and HA, which jumped the tracks at the time points t12 and t13, respectively start tracing the segmented video tracks S1 and S2, and S3 and S4 of the #k field from time points t14 and t15. In the #k field, contrary to the #i field, one head pair HA finishes tracing the segmented video tracks S21 and S22 at a time point t16 in which the head drum rotates 2.5 times from the beginning of the tracing. With a small delay time, the other head pair HB finishes tracing the final segmented video tracks S23 and S24 at a time point t17 in which the head drum rotates three times from the beginning of the tracing.

When the tracing of the segmented video tracks of the #k field is completed, both head pairs HA and HB respectively jump the tracks during the period from time points t16 and t17 to a time point t18 and a time point t19. From the time point t10 to the time point t18, the head drum rotates seven times. Thereafter, the head pairs will repeatedly carry out the tracing operation and the jump operation similarly.

In this embodiment, the displacement amounts of the same head pairs in the same field are equal (d10=d13 and d15=d17), whereas the displacement amount in the different fields are changed in response to the duration of the tracing period of each field.

This embodiment can achieve the similar action and effect to those of the first embodiment of the invention.

Further, in this embodiment, since availability of reproduced data is represented as 12/14, the revolution rate of the head drum is increased by 7/6 times.

While the present invention is explained for the case of twice the normal tape speed playback mode, the present invention can also be applied to the playback mode with a desired tape speed.

As set out above in detail, according to the present invention, since in the variable tape speed playback mode the rotary magnetic head is jumped from one track to another predetermined track during the period consisting of the sum of the magnetic tape non-contact period and the tracing period of one half track, it is possible to obtain a dynamic tracking method for a digital video tape recorder, by which the head can positively trace tracks from their starting portion of the field.

Having described preferred embodiments of the invention with reference to the accompanying drawings, it is to be understood that the present invention is not limited to those precise embodiments of the invention, and that many changes and variations could be effected by on skilled in the art without departing from the spirit and scope of the invention as defined in the appended claim.

I claim as my invention:

1. A method for controlling dynamic tracking heads of a digital video tape recorder of a type which, in a recording mode, records each field of a digital video signal in a respective plurality of segmented video tracks formed on a video tape wrapped around a head drum, while the head drum is rotated at a predetermined normal rotating speed and the tape is transported at a first tape transportation speed, and wherein, in a reproducing mode, said video tape is transported at a second tape transportation speed different from the first tape transportation speed, comprising the steps, in said reproducing mode of:

detecting the transportation speed of the video tape;
   forming a predetermined signal waveform in response to a pulse signal generated in accordance with the rotation of said head drum;
   reforming said predetermined signal waveform in response to said detected transportation speed of the video tape;
   determining an initial head position for said dynamic tracking heads at a beginning position of said segmented video tracks by detecting a position of the video tape
   combining said reformed predetermined signal waveform and said determined initial head position for generating a drive signal of said dynamic tracking heads; and
   changing said rotation speed of said head drum from said predetermined normal rotation speed for tracing said plurality of segmented video tracks in a shorter time so that enough time is provided for said dynamic tracking heads to jump from an end portion of said plurality of segmented video tracks to a beginning portion of another plurality of segmented video tracks.

2. The method according to claim 1, in which said shorter time is approximately the sum of a blank time and a tracing period of one-half a segmented video track.

3. The method according to claim 1, in which said dynamic tracking heads include two head pairs and in which the head pair at said beginning position of said segmented tracks alternates each field.

4. A method for controlling a digital video tape recorder of a type which, in a recording mode, records each field of a digital video signal in a respective plurality of segmented video tracks formed on a recording tape wrapped about a head drum while the head drum is rotated at a normal rotational speed and the tape is transported at a normal tape speed, and which, in a non-normal reproducing mode, transports the tape at a non-normal tape speed different from said normal tape speed and reproduces the recorded digital video signal by dynamic tracking heads mounted on the head drum and movable relative to the head drum in response to a dynamic tracking drive signal for scanning said tracks on the tape transported at said non-normal tape speed; said method comprising the steps, in said non-normal reproducing mode of:

rotating said head drum at a speed greater than said normal rotational speed for relatively shortening the time required for said dynamic tracking heads to trace each said plurality of segmented video tracks in which a respective field of the digital video signal is recorded, and varying said dynamic tracking drive signal so that the dynamic tracking heads jump from a concluding end portion of each said plurality of segmented video tracks to a beginning end portion of another plurality of segmented video tracks in an extended interval resulting from said shortening of the time required to trace each said plurality of segmented video tracks.

5. The method according to claim 4, in which said extended interval is approximately the sum of a blank time and a tracing period of one-half a segmented video track.

6. The method according to claim 4, in which said dynamic tracking heads comprise two dynamic tracking head pairs and in which the head pair at said beginning end portion of each respective plurality of segmented video tracks alternates each field.

* * * * *